UNITED STATES PATENT OFFICE.

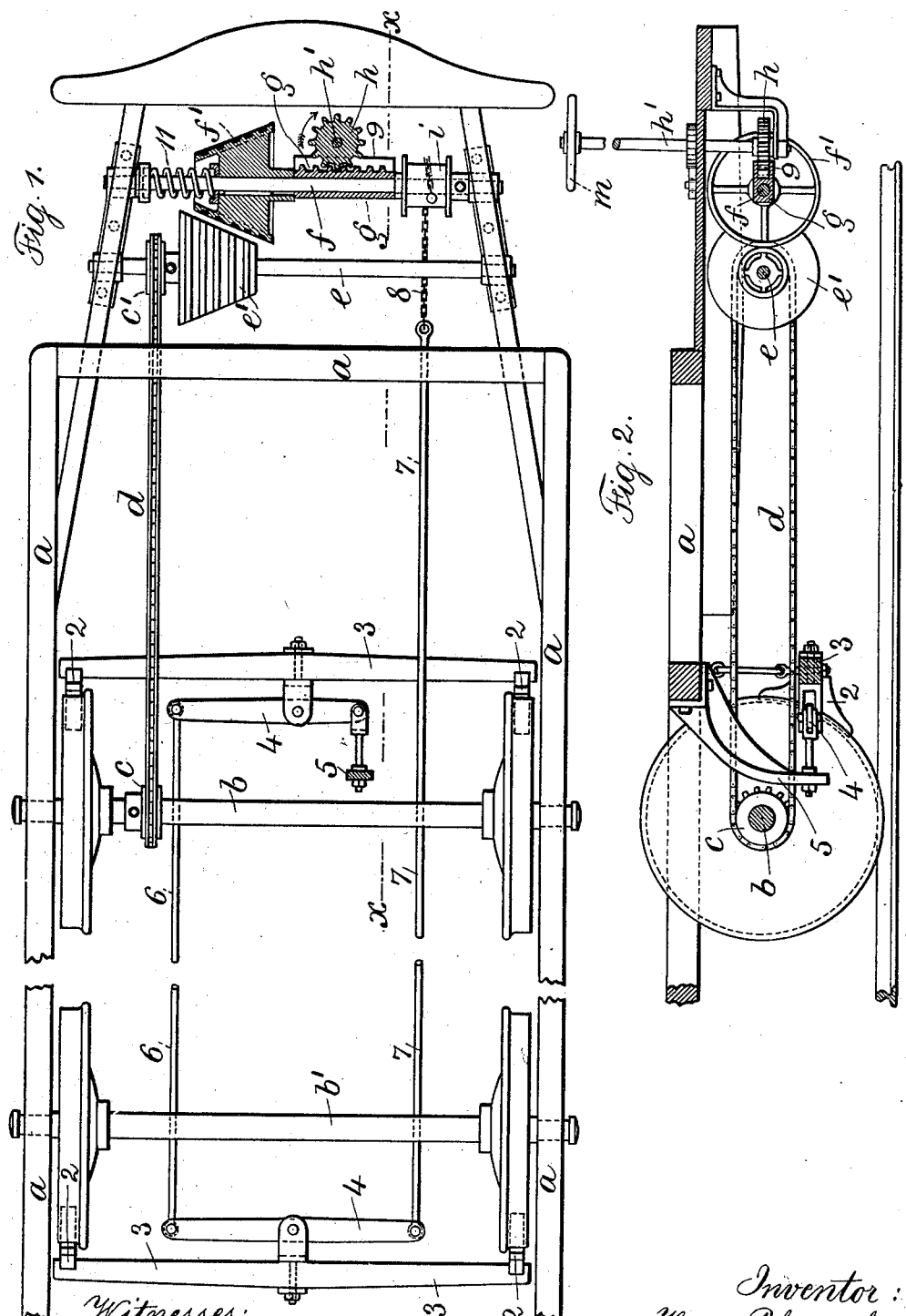

HENRY BLUMENBERG, JR., OF NEW YORK, N. Y.

CAR-BRAKE-OPERATING MECHANISM.

SPECIFICATION forming part of Letters Patent No. 663,671, dated December 11, 1900.

Application filed July 20, 1900. Serial No. 24,266. (No model.)

*To all whom it may concern:*

Be it known that I, HENRY BLUMENBERG, Jr., a citizen of the United States, residing at New York, (Wakefield,) borough of Bronx, State of New York, have invented an Improvement in Car-Brake-Operating Mechanisms, of which the following is a specification.

My invention relates to devices by which the brakes of a railway, trolley, or other car may be brought into or thrown out of operation at will by the motorman or brakeman, the power for applying the brakes being furnished by the movement of the vehicle.

In carrying out my invention oppositely-placed cone-pulleys are mounted upon shafts in bearings upon the frame of the car-body. One shaft is operatively connected to an axle of the wheels by a chain and sprockets, so that one pulley is continuously rotated. The brake-beams are connected by rods and brake-levers, and one rod is connected by a chain secured to a drum on the shaft of the other cone-pulley. On this latter shaft is a tubular rack held in place by suitable means which prevent it turning, and the rack meshes with a pinion on the vertical rod extending up through the car-platform and terminating with a wheel for the motorman. This wheel is adapted to operate the pinion and rack and move the cone-pulley longitudinally of the shaft in opposite directions; but usually a spring will be employed for returning these parts to a normal position after their operation by the motorman.

In the drawings, Figure 1 is a plan view of the frame of the car-body, the running-gear, and the devices constituting my invention; and Fig. 2 is a sectional elevation of the said parts at one end on the dotted line *x x*, Fig. 1.

The frame *a* of the car-body may be of any usual construction. I have shown in the drawings a frame of ordinary form.

*b b'* are the wheel-axles upon which the car wheels are mounted, the bearings therefor being of usual character attached to the frame.

2 represents the brake-shoes, and 3 the brake-beams to which the shoes are connected, these beams being hung in any ordinary manner from the frame of the car-body. The brake-levers 4 are pivoted, respectively, to the brake-beams, and 5 represents a fixed post connected to the frame of the car-body and having a rod extending therefrom to one brake-lever. A rod 6 connects the ends of two brake-levers, and a rod 7 extends from one brake-lever forward and terminates in a chain 8.

The sprocket *c* is secured to the wheel-axle *b* and the sprocket *c'* to a shaft *e* in bearings upon the frame of the car-body, and a chain *d* passes around said sprockets, and by these sprockets and chain a continuous rotation is imparted to the shaft *e* so long as the car is in motion. The shaft *e* carries the cone-pulley *e'*, and parallel with the shaft *e* is a shaft *f*, carrying a cone-pulley *f''*, also in bearings upon the frame of the car-body, and the cone-pulleys are oppositely placed, and on the shaft *f* is a drum *i*, to which one end of the chain 8 is connected. A spline connects the pulley *f'* to the shaft *f*.

Upon the shaft *f* is a tubular rack *g*, meshing with a pinion *h* upon the lower end of the vertical shaft *h'*, which shaft *h'* passes up through the platform of the car and is provided with suitable bearings and at its upper end with a hand-wheel *m*. The tubular rack *g* upon the shaft *f* is preferably provided with edge flanges 9, extending across opposite faces of the pinion *h*, which becomes a guide to prevent the tubular rack turning on the shaft, but, however, permitting of the free rotation of the shaft *f*. This rack *g* bears at one end against the hub of the cone-pulley to move the pulley in one direction, the rack coming against the drum *i* at the other end when the parts are inoperative. I prefer to employ a spring 11 around the shaft *f* between a bearing at one end and one end of the cone-pulley *f'*.

In the operation of the device the motorman or brakeman turning the hand-wheel, the shaft *h'*, and pinion *h* in the direction of the arrow will move the tubular rack *g* and cone-pulley *f'* so that the surfaces of the cone-pulleys will come in contact and regardless of the direction of the moving vehicle. The cone-pulley *e'*, turning all the time, will operate the cone-pulley *f''*, the shaft *f*, and the drum *i* to wind up the chain 8 and draw upon the rods 7 and 6, swinging the brake-levers 4, and so applying the brakes against the car-wheels to stop the vehicle, the power of the moving vehicle thus being utilized to put on the brake and the motorman or brakeman doing nothing more than bringing the cone-pulleys into contact and holding them there until the vehicle stops, after which the motorman releases the hand-wheel and parts connected therewith and the spring 11 returns the parts to a normal position, moving the cone-pulleys out of contact, or the motorman or brakeman may move the hand-wheel in the reverse direction and effect the same object.

I have shown and prefer to employ cone-pulleys each having a sectional or divided surface—that is, where the metal surface is divided by circumferential spaced-apart bands of another material, such as leather—to facilitate the transmission of power.

I claim as my invention—

1. The combination with the brake-beams and brake-shoes and the rods and levers for operating the same, of a shaft in bearings in the frame of the car-body, a cone-pulley upon said shaft, sprockets respectively upon the shaft of the cone-pulley and one of the car-wheel axles and a chain connecting the same, an oppositely-placed independent cone-pulley adapted to engage the aforesaid cone-pulley and a separate shaft thereof, a drum upon the latter shaft and to which the braking devices are connected, and means brought into operation by and at the will of the motorman for imparting a longitudinal movement to the latter cone-pulley to bring the cone-pulleys into contact to apply the brake, and means for moving the latter cone-pulley away from the former when released, substantially in the manner and for the purposes set forth.

2. The combination with the brake-beams, and brake-shoes and the rods and levers for operating the same, of a shaft in bearings in the frame of the car-body, a cone-pulley upon said shaft, sprockets respectively upon the shaft of the cone-pulley and one of the car-wheel axles and a chain connecting the same, a cone-pulley adapted to engage the aforesaid cone-pulley and a shaft therefor, a drum upon the said shaft to which the braking devices are connected, a tubular rack on the shaft of the latter cone-pulley, collars for maintaining the position of the said rack upon the shaft and guiding the same, a spring for moving the rack and cone-pulley in one direction, a pinion meshing with the rack and a shaft and hand-wheel for operating the pinion, for moving the cone-pulley in the opposite direction, substantially as set forth.

Signed by me this 12th day of July, 1900.

HENRY BLUMENBERG, JR.

Witnesses:
GEO. T. PINCKNEY,
BERTHA M. ALLEN.